(12) United States Patent  (10) Patent No.: US 8,729,858 B2
McMullin                    (45) Date of Patent:     May 20, 2014

(54) CHARGING DEVICE FOR USE IN CHARGING ELECTRIC VEHICLES AND METHOD OF PROVIDING ELECTRICITY TO AN ELECTRIC VEHICLE

(75) Inventor: Dale Robert McMullin, Canton, GA (US)

(73) Assignee: General Electric Company, Schenectady, NY (US)

( * ) Notice: Subject to any disclaimer, the term of this patent is extended or adjusted under 35 U.S.C. 154(b) by 296 days.

(21) Appl. No.: 13/191,187

(22) Filed: Jul. 26, 2011

(65) Prior Publication Data

US 2013/0026985 A1    Jan. 31, 2013

(51) Int. Cl.
*H02J 7/00*      (2006.01)

(52) U.S. Cl.
USPC ......................................... 320/109

(58) Field of Classification Search
USPC .......................................... 320/109
See application file for complete search history.

(56) References Cited

U.S. PATENT DOCUMENTS

| | | | |
|---|---|---|---|
| 4,608,552 A | 8/1986 | Boutonnat et al. | |
| 5,565,755 A | 10/1996 | Keith | |
| 5,596,261 A * | 1/1997 | Suyama | 320/152 |
| 6,469,511 B1 | 10/2002 | Vonderhaar et al. | |
| 7,833,482 B2 | 11/2010 | Samari | |
| 8,013,571 B2 * | 9/2011 | Agassi et al. | 320/109 |
| 2010/0141206 A1 * | 6/2010 | Agassi et al. | 320/109 |

* cited by examiner

*Primary Examiner* — Arun Williams
(74) *Attorney, Agent, or Firm* — General Electric Company

(57) ABSTRACT

A method of delivering power from a power supply to an electric vehicle is described herein. The method includes receiving a request to deliver power from the power supply to the electric vehicle. A first monitoring signal indicative of a combustible gas is transmitted from a sensor to a controller. The controller determines whether electrical power is to be delivered, from a charging device to the electric vehicle, based at least in part on the received first monitoring signal.

20 Claims, 3 Drawing Sheets

CHARGING DEVICE FOR USE IN CHARGING ELECTRIC VEHICLES AND METHOD OF PROVIDING ELECTRICITY TO AN ELECTRIC VEHICLE

BACKGROUND OF THE INVENTION

The present application relates generally to charging devices and, more particularly, to a charging device, a system, and a method of supplying power to at least one load.

As electric vehicles and/or hybrid electric vehicles have gained popularity, an associated need to manage delivery of electrical energy to such vehicles has increased. In addition, a need to provide safe and efficient charging devices or stations has been created by the increased use of such vehicles.

At least some known charging stations include a power cable or other conductor that may be removably coupled to the electric vehicle. The charging stations receive electricity from an electric utility distribution network or another electricity source, and deliver electricity to the electric vehicle through the power cable. Known charging stations may be located in areas that are adjacent to conventional automobiles that include sources of combustible gases that may be discharged into ambient air surrounding the charging stations. The proximity of the combustible gases to the electrical charging stations may increase the possibility of an undesirable ignition of the combustible gases during use of the charging station that may result in damage to the charging station.

BRIEF DESCRIPTION OF THE INVENTION

In one embodiment, a method of delivering power from a power supply to an electric vehicle is provided. The method includes receiving a request to deliver power from the power supply to the electric vehicle. A first monitoring signal indicative of a combustible gas is transmitted from a sensor to a controller. The controller determines whether electrical power is to be delivered, from a charging device to the electric vehicle, based at least in part on the received first monitoring signal.

In another embodiment, a charging device for use in delivering power to an electric vehicle is provided. The charging device includes a power delivery assembly that is coupled to a power supply to selectively delivery power from the power supply to the electric vehicle. A sensor is configured to sense a combustible gas and to generate a first monitoring signal indicative of the sensed combustible gas. A controller is coupled to the sensor and to the power delivery assembly. The controller is configured to deliver power to the electric vehicle based at least in part on the received first monitoring signal.

In yet another embodiment, a power delivery system for use in charging an electric vehicle is provided. The power charging system includes a power conduit that is configured to be electrically coupled to an electric vehicle and a charging device that is electrically coupled between the power conduit and a power supply for selectively delivering power from the power supply to the electric vehicle through the power conduit. The charging device includes a power delivery assembly that is coupled to a power supply to selectively deliver power from the power supply to the electric vehicle and a sensor that is configured to sense a combustible gas and to generate a first monitoring signal indicative of the sensed combustible gas. A controller is coupled to the sensor and to the power delivery assembly. The controller is configured to deliver power to the electric vehicle based at least in part on the received first monitoring signal.

DETAILED DESCRIPTION OF THE INVENTION

The exemplary methods and systems described herein overcome at least some disadvantages of known electrical charging devices by selectively delivering power to an electric vehicle based on a presence of combustible gases. Moreover, the charging device described herein includes a sensor that senses a presence of combustible gases within ambient air surrounding the charging device. The charging device delivers power to an electric vehicle if the concentration of combustible gases within ambient air is less than a predefined combustible gas concentration. By providing a charging device that senses a presence of combustible gas, and delivers power to an electric vehicle based on the presence of the combustible gases, the potential for undesirable ignition of the combustible gases is reduced. By reducing undesirable ignition of combustible gases surrounding a charging device, the cost of maintaining and/or replacing a charging device is reduced.

In some embodiments, the term "electric vehicle" refers generally to a vehicle that includes one or more electric motors that are used for propulsion. Energy used to propel electric vehicles may come from various sources, such as, but not limited to, an on-board rechargeable battery and/or an on-board fuel cell. In one embodiment, the electric vehicle is a hybrid electric vehicle, which captures and stores energy generated, for example, by braking. A hybrid electric vehicle uses energy stored in an electrical source, such as a battery, to continue operating when idling to conserve fuel. Some hybrid electric vehicles are capable of recharging the battery by plugging into a power receptacle, such as a power outlet. Accordingly, the term "electric vehicle" as used herein may refer to a hybrid electric vehicle or any other vehicle to which electrical energy may be delivered, for example, via the power grid.

Figure 1:
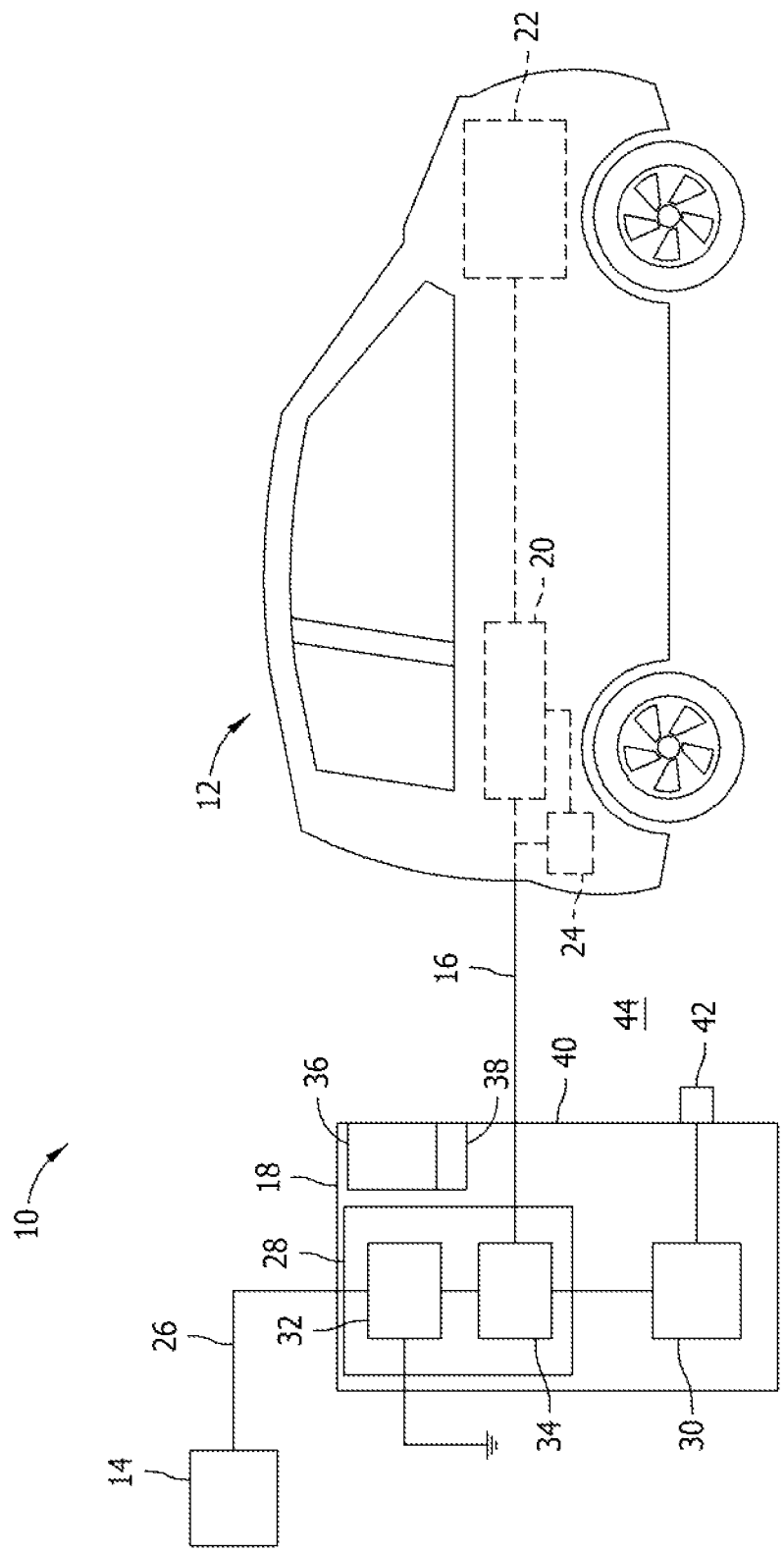
FIG. 1 is a block diagram of an exemplary power delivery system for use in providing electricity to an electric vehicle.
Figure 2:
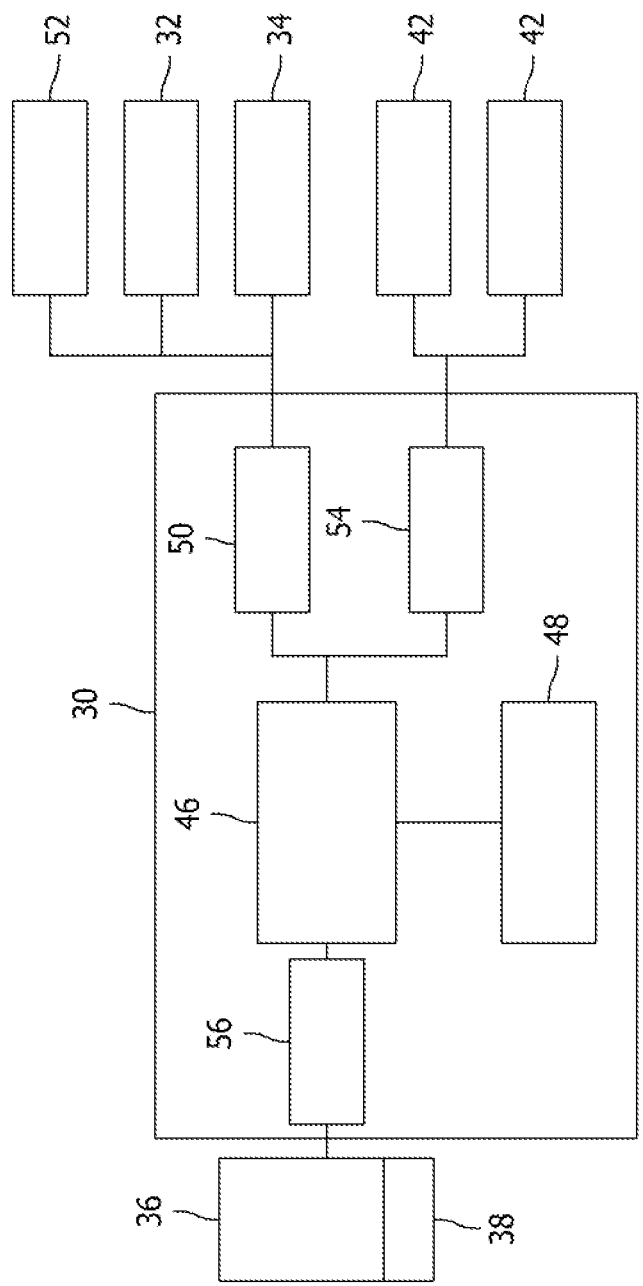
FIG. 2 is a block diagram of the exemplary controller shown in FIG. 1.

FIG. 1 is a block diagram of an exemplary power delivery system 10 for use in charging, or providing electricity to, at least one rechargeable electrical load, such as an electric vehicle 12. In the exemplary embodiment, power delivery system 10 includes an electric power supply 14, a power delivery conduit 16 that is coupled to electric vehicle 12, and a charging device 18 that is electrically coupled between power delivery conduit 16 and electric power supply 14 to selectively deliver electrical power from electric power supply 14 to electric vehicle 12 through power delivery conduit 16. Electric vehicle 12 includes at least one power storage device 20, such as a battery and/or any other electrical storage device, coupled to a motor 22. Electric vehicle 12 also includes a vehicle controller 24 operatively coupled to power storage device 20.

Charging device 18 is removably coupled to power storage device 20 and to vehicle controller 24 with power delivery conduit 16. Alternatively, charging device 18 may be coupled to vehicle controller 24 by a wireless data link (not shown). In the exemplary embodiment, power delivery conduit 16 includes at least one conductor (not shown) for supplying electricity to power storage device 20, and at least one conductor (not shown) for transmitting data to, and receiving data from, vehicle controller 24. Alternatively, power delivery conduit 16 may include a single conductor that transmits and/or receives power and/or data, or any other number of conductors that enables power delivery system 10 to function as described herein.

In an exemplary embodiment, electric power supply 14 is, for example, a generator, a battery, and/or any other device or system that provides electricity to charging device 18. Charging device 18 is electrically coupled to electric power supply 14 with an electrical distribution bus 26. Electrical distribution bus 26 is a three-phase bus, such as a portion of an electric power grid of a utility company, providing alternating current (AC) power (i.e., AC current and voltage) to charging device 18. Alternatively, electrical distribution bus 26 may include any number of phases of AC power to charging device 18.

In the exemplary embodiment, charging device 18 includes a power delivery assembly 28 and a controller 30 coupled in operative communication with power delivery assembly 28. Power delivery assembly 28 includes a protection device 32 and a power conditioning device 34. Protection device 32 is coupled between power source 14 and power conditioning device 34 to selectively electrically isolate and/or disconnect power conditioning device 34 from electrical distribution bus 26. Protection device 32 includes a circuit breaker (not shown). Alternatively, protection device 32 may be a fuse, a relay, and/or any other device that enables protection device 32 to function as described herein. In one embodiment, protection device 32 is electrically coupled to ground for discharging electrical power from power source 14 to ground to facilitate electrically isolating and/or disconnecting charging device 18 from vehicle power storage device 20.

In the exemplary embodiment, power conditioning device 34 is coupled between power protection device 32 and vehicle power storage device 20 to selectively deliver power from power source 14 to vehicle power storage device 20. Power conditioning device 34 adjusts at least one characteristic of the volt-amperes received from electric power supply 14 and converts the AC volt-amperes received from electric power supply 14 to DC power for use in charging vehicle power storage device 20. Controller 30 operates power delivery assembly 28 to selectively deliver electrical power from electric power supply 14 to electric vehicle 12. In the exemplary embodiment, controller 30 receives a direct current (DC) charging request from vehicle controller 24 representative of a demanded charging current for use in charging power storage device 20 (hereinafter referred to as a "DC demand"). Controller 30 determines a commanded DC current (hereinafter referred to as a "DC command") based on the DC demand and transmits data representative of the DC command to power delivery assembly 28.

Controller 30 operates power conditioning device 34 to convert AC volt-amperes received from electric power supply 14 to DC power based at least in part on the DC command, and to deliver the converted DC power to vehicle power storage device 20 through power delivery conduit 16 to electrically charge vehicle power storage device 20. In one embodiment, power conditioning device 34 may receive, from controller 30, varying DC command levels during charging, as power storage device 20 reaches a full charge.

In the exemplary embodiment, charging device 18 includes a display 36 and a user interface 38 that are each coupled to controller 30. Display 36 and/or user interface 38 may be coupled to an outer surface 40 of charging device 18 or may be positioned at any suitable location such that display 36 and user interface 38 are accessible to a user. Display 36 includes a vacuum fluorescent display (VFD) and/or one or more light-emitting diodes (LED). Additionally or alternatively, display 36 may include, without limitation, a liquid crystal display (LCD), a cathode ray tube (CRT), a plasma display, and/or any suitable visual output device capable of displaying graphical data and/or text to a user. In an exemplary embodiment, a charging request, a charging level, a unit financial cost of electrical power, an accumulated electrical power financial cost incurred during charging, and/or any other information may be displayed to a user on display 36. User interface 38 includes, without limitation, a keyboard, a keypad, a touch-sensitive screen, a scroll wheel, a pointing device, a barcode reader, a magnetic card reader, a radio frequency identification (RFID) card reader, an audio input device employing speech-recognition software, and/or any suitable device that enables a user to input data into controller 30 and/or to retrieve data from controller 30. In the exemplary embodiment, the user may input a predefined amount of electrical power demand and/or financial amount for use in charging power storage device 20 using user interface 38. Moreover, the user may operate user interface 38 to initiate and/or terminate an operation of charging device 18.

In the exemplary embodiment, charging device 18 also includes one or more sensors 42 positioned in flow communication with ambient air 44 surrounding charging device 18 and/or electric vehicle 12 to monitor ambient air 44 to determine a presence of combustible gases, and/or toxic gases. Controller 30 is coupled in operative communication with sensors 42 such that commands generated by controller 30 cause sensors 42 to monitor ambient air 44 for the presence of combustible zones, toxic zones, and/or oxygen deficient zones, and to activate other control settings on charging device 18 based on a sensed presence of combustible gases, and/or toxic gases within ambient air 44. In the exemplary embodiment, sensors 42 sense a combustible gas such as, for example, gasoline vapor, natural gas, methane, butane, propane and/or hydrogen. Sensors 42 sense a combustible gas within ambient air 44, and transmit a signal indicative of the combustible gas to controller 30. Controller 30 determines whether to operate charging device 18 to deliver electric power from power source 14 to electric vehicle 12 based at least in part on the sensed presence of a combustible gas within ambient air 44.

During operation of charging device 18, a user couples power storage device 20 to charging device 18 with power delivery conduit 16. The user may access user interface 38 to enter information, such as, for example, a power delivery request, an amount of demanded charging current, and/or payment information, to initiate power delivery from power source 14 to power storage device 20. Controller 30 receives a request from user interface 38 to deliver power, and monitors ambient air 44 surrounding charging device 18 and/or electric vehicle 12 for a presence of combustible gases within ambient air 44. Sensor 42 transmits to controller 30 a first monitoring signal indicative of a combustible gas within ambient air 44. Controller 30 determines whether combustible gases are present within ambient air 44 based at least in part on the received first monitoring signal. Controller 30 operates power conditioning device 34 to deliver power from power source 14 to electric vehicle 12 after determining that no combustible gases exist within ambient air 44. If controller 30 determines combustion gases to be present within ambient air 44, controller 30 does not initiate a power delivery to electric vehicle 12 and displays a notification signal that is indicative of the presence of combustible gases to the user, and notifies the user of the non-initiated power delivery.

In the exemplary embodiment, after determining that no combustion gases are present within ambient air 44, charging device 18 receives power from electric power supply 14 and provides the power to power storage device 20 through power delivery conduit 16. Controller 30 communicates with vehicle controller 24 wirelessly, through power delivery conduit 16, and/or through any other conduit, to control and/or to monitor the delivery of power to power storage device 20. For example, vehicle controller 24 may transmit signals to controller 30 indicating a charge level of power storage device 20 and/or a desired amount and/or rate of power to be provided by charging device 18. Charging device controller 30 may transmit signals to vehicle controller 24 indicating an amount and/or rate of electricity being delivered to power storage device 20. Additionally or alternatively, charging device 18 and/or vehicle controller 24 may transmit and/or receive any other signals or messages that enable power delivery system 10 to function as described herein. When power storage device 20 has been charged to a desired level, charging device 18 ceases delivering power to power storage device 20 and the user disengages power delivery conduit 16 from power storage device 20.

During delivery of power to electric vehicle 12, controller 30 monitors ambient air 44 and receives from sensor 42 a second signal that is indicative of combustible gases within ambient air 44. Controller 30 determines whether combustible gases are present within ambient air 44 during delivery of power to electric vehicle 12, and operates protection device 32 to discontinue power delivery to electric vehicle 12 after determining combustible gases to be present within ambient air 44. In the exemplary embodiment, controller 30 operates protection device 32 to disconnect power conditioning device 34 from electrical distribution bus 26. Alternatively, controller 30 may operate protection device 32 to discharge electrical power from power source 14 to ground to electrically isolate power conditioning device 34 from power source 14. In the exemplary embodiment, controller 30 displays a notification signal on display 36 to inform the user that combustible gases have been detected within ambient air 44 and that power delivery has been discontinued.

In one embodiment, controller 30 calculates a concentration of combustible gases present in ambient air 44 based at least in part on the received first signal from sensor 42. Controller 30 operates power conditioning device 34 to deliver power from power source 14 to electric vehicle 12 if the calculated concentration of combustible gases is equal to, or less than, a predefined combustion gas concentration. In addition, during power delivery, controller 30 calculates a concentration of combustible gases within ambient air 44 based at least in part on the received second signal from sensor 42. Controller 30 discontinues power delivery from charging device 18 to electric vehicle 12 if the calculated combustible gas concentration is equal to, or greater than, a predefined combustible gas concentration.

Figure 3:
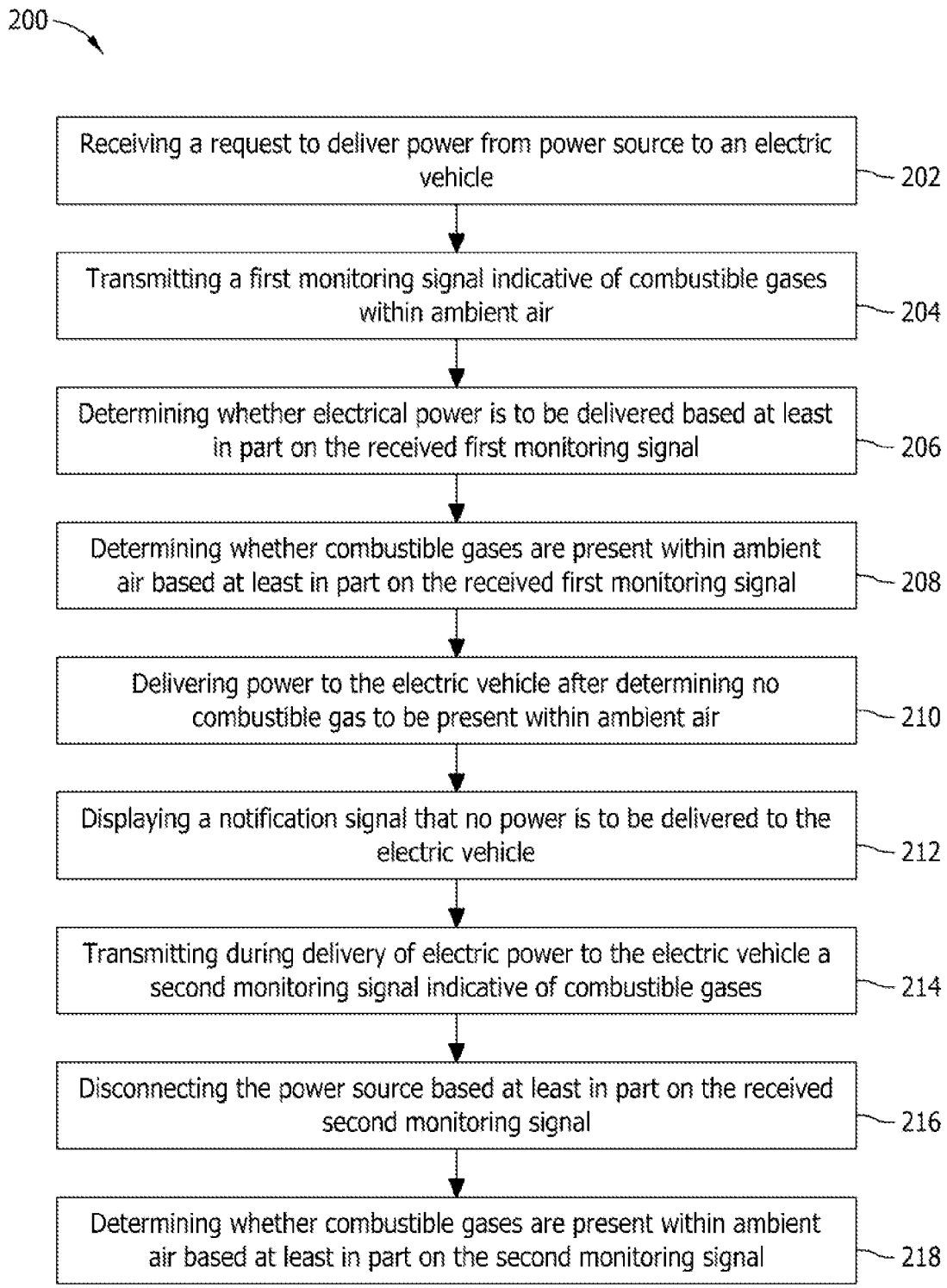
FIG. 3 is a flow diagram of an exemplary method of delivering power to an electric vehicle that may be used with the power delivery system shown in FIG. 1.

FIG. 3 is a block diagram of controller 30. In the exemplary embodiment, controller 30 includes a processor 46 and a memory device 48. Processor 46 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." Memory device 48 includes a computer readable medium, such as, without limitation, random access memory (RAM), flash memory, a hard disk drive, a solid state drive, a diskette, a flash drive, a compact disc, a digital video disc, and/or any suitable device that enables processor 46 to store, retrieve, and/or execute instructions and/or data.

In the exemplary embodiment, controller 30 includes a control interface 50 that controls an operation of charging device 18. Control interface 50 is coupled to one or more control devices 52, such as, for example, protection device 32 and/or power conditioning device 34, respectively. Controller 30 also includes a sensor interface 54 that is coupled to at least one sensor 42. Each sensor 42 transmits a signal corresponding to a sensed operating parameter of charging device 18, such as, for example, a presence and/or concentration of combustible gases within ambient air 44. Each sensor 42 may transmit a signal continuously, periodically, or only once, for example, although other signal timings are also contemplated. Moreover, each sensor 42 may transmit a signal either in an analog form or in a digital form. In addition, controller 30 includes a communication interface 56 that is coupled to display 36 and/or user interface 38 for transmitting signals to, and receiving signals from, display 36 and/or user interface 38.

Various connections are available between control interface 50 and control device 52, between sensor interface 54 and sensors 42, and between processor 46 and display 36 and/or user interface 38. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside charging device 18) network connection, whether wired or wireless.

During operation of charging device 18, controller 30 receives a first signal from sensor 42 that is indicative of combustible gases within ambient air 44. Processor 46 determines whether combustion gases are present within ambient air 44 based at least in part on the received first signal, and operates charging device 18 to deliver power to electric vehicle 12 after determining that no combustible gases are present within ambient air 44. In addition, upon determining that combustible gases are present within ambient air 44, processor 46 does not initiate a power delivery, and displays a notification signal on display 36 that notifies a user that combustible gases have been detected and that power delivery will not be initiated. In one embodiment, processor 46 calculates a concentration of combustible gases present within ambient air 44 based at least in part on the received first signal, and delivers power to electric vehicle 12 if the calculated combustible gas concentration is equal to, or less than, a predefined concentration of combustible gases. Moreover, upon determining that the calculated combustible gas concentration is greater than the predefined concentration, processor 46 does not initiate a power delivery and displays a notification signal on display 36 to notify a user that a concentration of combustible gases is present that is greater than a predefined concentration, and that power delivery will not be initiated.

During a power delivery, controller 30 also receives a second signal from sensor 42 that is indicative of combustible gases within ambient air 44. During power delivery, processor 46 determines whether combustion gases are present within ambient air 44, and discontinues power delivery to electric vehicle 12 after determining that combustible gases are present. Processor 46 displays a notification signal to the user to notify the user that combustible gases have been detected within ambient air 44, and that power delivery has been discontinued. In one embodiment, processor 46 calculates a concentration of combustible gases present within ambient air 44, and discontinues power delivery if the calculated combustible gas concentration is equal to, or greater than, a predefined concentration of combustible gases. Upon determining that the calculated combustible gas concentration is equal to, or greater than, a predefined concentration, processor 46 displays a notification signal to the user notifying the user that a concentration of combustible gases has been detected that is equal to, or greater than, a predefined concentration, and that power delivery has been discontinued.

FIG. 3 is a flow chart of an exemplary method 200 that may be used to deliver power to electric vehicle 12. In the exemplary embodiment, method 200 includes receiving 202, by controller 30 from electric vehicle 12 and/or a user, a request to deliver power from power source 14 to electric vehicle 12. Sensor 42 transmits 204 to controller 30 a first monitoring signal indicative of combustible gases within ambient air 44. Controller 30 determines 206 whether electrical power is to be delivered, from charging device 18 to electric vehicle 12, based at least in part on the received first monitoring signal. In addition, controller 30 determines 208 whether combustible gases are present within ambient air 44 based at least in part on the received first monitoring signal, and delivers 210 power to electric vehicle 12 after determining 208 no combustible gas to be present within ambient air 44. Controller 30 also displays 212 a notification signal to the user after determining 208 combustible gases are present, and that no power is to be delivered to electric vehicle 12. In one embodiment, controller 30 calculates a concentration of combustible gases present within ambient air 44 based at least in part on the received first monitoring signal, and delivers 210 power to the electric vehicle if the calculated combustible gas concentration is less than a predefined combustible gas concentration.

In the exemplary embodiment, method 200 also includes transmitting 214 during delivery of electric power from power source 14 to electric vehicle 12, from sensor 42 to controller 30, a second monitoring signal indicative of combustible gases. Controller 30 disconnects 216 power source 14 from electric vehicle 12 based at least in part on the received second monitoring signal. Moreover, controller 30 determines 218 whether combustible gases are present within ambient air 44 based at least in part on the second monitoring signal, and disconnects 216 power source 14 after determining 218 combustible gases to be present. In one embodiment, method 200 includes calculating, by controller 30, a concentration of combustible gases based at least in part on the received second monitoring signal, and disconnecting power source 14 from electric vehicle 12 after determining the calculated combustible gas concentration to be different than a predefined gas concentration. Controller 30 displays a notification signal to the user after determining combustible gases are present, and disconnecting power source 14 from electric vehicle 12.

Charging device 18 selectively delivers power to the electric vehicle 12 based on the presence of combustible gases surrounding the charging device 18 to reduce the risk of undesirably igniting the combustible gases and causing damage to the charging device, the electric vehicle, and/or the user. In addition, charging device 18 monitors the presence of combustible gases during power delivery and disconnects power delivery if combustible gases are sensed during power delivery, which reduces the risk of undesirable ignition of combustible gases during power delivery and reduces the cost of maintaining and/or replacing charging device 18.

The above-described systems and methods overcome at least some disadvantages of known charging devices by selectively delivering power to an electric vehicle based on a presence of combustible gases surrounding the charging device. Moreover, the embodiments described herein include a charging device that includes a sensor that senses a presence of combustible gases within ambient air surrounding the charging device, and delivers power if the sensed combustible gas concentration is less than a predefined combustible gas concentration. In addition, the charging device senses combustible gases during power delivery and disconnects power if combustible gases are present. As such, the potential for undesirable ignition of the combustible gases which may damage the charging device is reduced, which reduces the cost of maintaining and/or replacing a charging device and extends the operational life of the charging device.

An exemplary technical effect of the methods, system, and apparatus described herein includes at least one of: (a) receiving a request to deliver power from the power supply to the electric vehicle; (b) transmitting, from a sensor to a controller, a first monitoring signal indicative of a combustible gas; (c) determining, by the controller, whether electrical power is to be delivered, from a charging device to the electric vehicle, based at least in part on the received first monitoring signal; (d) determining whether a combustible gas is present based at least in part on the received first monitoring signal; (e) delivering power to the electric vehicle after determining no combustible gas to be present; (f) displaying a notification signal to a user after determining a combustible gas is present, and determining no power is to be delivered to the electric vehicle.

Exemplary embodiments of a charging device, a system, and a method of providing electricity to an electric vehicle are described above in detail. The charging device, system, and method are not limited to the specific embodiments described herein, but rather, components of the charging device and/or system and/or steps of the method may be utilized independently and separately from other components and/or steps described herein. For example, the charging device may also be used in combination with other power systems and methods, and is not limited to practice with only the electric vehicle as described herein. Rather, an exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of providing electricity from a power supply to an electric vehicle, said method comprising:
receiving a request to deliver power from the power supply to the electric vehicle;
transmitting, from a sensor to a controller, a first monitoring signal indicative of a combustible gas in ambient air exterior to the electric vehicle; and determining, by the controller, whether electrical power is to be delivered, from a charging device to the electric vehicle, based at least in part on the received first monitoring signal.

2. A method in accordance with claim 1, further comprising:
determining whether a combustible gas is present based at least in part on the received first monitoring signal; and
delivering power to the electric vehicle after determining no combustible gas to be present.

3. A method in accordance with claim 2, further comprising displaying a notification signal to a user after determining a combustible gas is present, and determining no power is to be delivered to the electric vehicle.

4. A method in accordance with claim 1, further comprising:
calculating a concentration of combustible gas based at least in part on the received first monitoring signal; and
delivering power to the electric vehicle if the calculated combustible gas concentration is less than a predefined combustible gas concentration.

5. A method in accordance with claim 1, further comprising:
transmitting, during delivery of power from the power supply to the electric vehicle, a second monitoring signal indicative of a combustible gas in the ambient air exterior to the electric vehicle; and
disconnecting the power supply from the electric vehicle based at least in part on the received second monitoring signal.

6. A method in accordance with claim 5, further comprising:
determining whether a combustible gas is present based on the second monitoring signal; and
disconnecting the power supply from the electric vehicle after determining a combustible gas is present.

7. A method in accordance with claim 5, further comprising:
calculating a concentration of combustible gas based at least in part on the received second monitoring signal; and
disconnecting the power supply from the electric vehicle after determining the calculated combustible gas concentration is different than a predefined gas concentration.

8. A method in accordance with claim 7, further comprising displaying a notification signal after determining a combustible gas is present and disconnecting the power supply from the electric vehicle.

9. A charging device for use in delivering power to an electric vehicle, said charging device comprising:
a power delivery assembly coupled to a power supply to selectively delivery power from the power supply to the electric vehicle;
a sensor configured to sense a combustible gas in ambient air exterior to the electric vehicle, and to generate a first monitoring signal indicative of the sensed combustible gas; and
a controller coupled to said sensor and said power delivery assembly, said controller configured to deliver power to the electric vehicle based at least in part on the received first monitoring signal.

10. A charging device in accordance with claim 9, wherein said controller is further configured to:
determine whether a combustible gas is present based at least in part on the received first monitoring signal; and
deliver power to the electric vehicle after determining no combustible gas to be present.

11. A charging device in accordance with claim 9, wherein said controller is further configured to:
calculate a concentration of combustible gas based at least in part on the received first monitoring signal; and
deliver power to the electric vehicle if the calculated combustible gas concentration is less than a predefined combustible gas concentration.

12. A charging device in accordance with claim 9, wherein said sensor is further configured to transmit a second monitoring signal during delivery of power from the power supply to the electric vehicle that is indicative of a combustible gas in the ambient air exterior to the electric vehicle, said controller configured to disconnect the power supply from the electric vehicle based at least in part on the received second monitoring signal.

13. A charging device in accordance with claim 12, wherein said controller is further configured to:
determine whether a combustible gas is present based on the second monitoring signal; and
disconnect the power supply from the electric vehicle after determining a combustible gas is present.

14. A charging device in accordance with claim 13, wherein said controller is further configured to display a notification signal after determining a combustible gas is present and disconnecting the power supply from the electric vehicle.

15. A charging device in accordance with claim 12, wherein said controller is further configured to:
calculate a concentration of combustible gas based at least in part on the received second monitoring signal; and
disconnect the power supply from the electric vehicle after determining the calculated combustible gas concentration is different than a predefined gas concentration.

16. A power delivery system for use in charging an electric vehicle, said power charging system comprising:
a power conduit configured to be electrically coupled to an electric vehicle; and
a charging device electrically coupled between said power conduit and a power supply for selectively delivering power from the power supply to the electric vehicle through said power conduit, said charging device comprising:
a power delivery assembly coupled to the power supply to selectively deliver power from the power supply to the electric vehicle;
a sensor configured to sense a combustible gas in the ambient air exterior to the electric vehicle, and to generate a first monitoring signal indicative of the sensed combustible gas; and
a controller coupled to said sensor and said power delivery assembly, said controller configured to deliver power to the electric vehicle based at least in part on the received first monitoring signal.

17. A power delivery system in accordance with claim 16, wherein said controller is further configured to:
determine whether a combustible gas is present based at least in part on the received first monitoring signal; and
deliver power to the electric vehicle after determining no combustible gas to be present.

18. A power delivery system in accordance with claim 16, wherein said controller is further configured to:
calculate a concentration of combustible gas based at least in part on the received first monitoring signal; and deliver power to the electric vehicle if the calculated combustible gas concentration is less than a predefined combustible gas concentration.

19. A power delivery system in accordance with claim 16, wherein said sensor is configured to transmit a second monitoring signal during delivery of power from the power supply to the electric vehicle that is indicative of a combustible gas in the ambient air exterior to the electric vehicle, said controller configured to:
  determine whether a combustible gas is present based on the second monitoring signal; and
  disconnect the power supply from the electric vehicle after determining a combustible gas is present.

20. A power delivery system in accordance with claim 19, wherein said controller is further configured to:
  calculate a concentration of combustible gas based at least in part on the received second monitoring signal; and
  disconnect the power supply from the electric vehicle after determining the calculated combustible gas concentration is different than a predefined gas concentration.

* * * * *